(12) United States Patent
Mukouyama et al.

(10) Patent No.: US 6,380,350 B1
(45) Date of Patent: Apr. 30, 2002

(54) POLYASPARTIC ACID

(75) Inventors: Masaharu Mukouyama, Ibaraki; Shinzo Yasuda, Ushiku, both of (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

(21) Appl. No.: 09/658,172

(22) Filed: Sep. 8, 2000

(30) Foreign Application Priority Data

Sep. 10, 1999 (JP) .......................................... 11-257973

(51) Int. Cl.$^7$ .............................................. C08G 69/10
(52) U.S. Cl. ..................... 528/328; 528/486; 528/499; 528/503
(58) Field of Search ................................ 528/328, 486, 528/499, 503

(56) References Cited

U.S. PATENT DOCUMENTS

| | | | |
|---|---|---|---|
| 5,221,733 A | 6/1993 | Koskan et al. ............... | 530/333 |
| 5,319,145 A | 6/1994 | Paik et al. .................... | 528/328 |
| 5,380,817 A | 1/1995 | Paik et al. .................... | 528/328 |
| 5,391,764 A | 2/1995 | Koskan et al. ............... | 548/520 |
| 5,457,176 A | 10/1995 | Adler et al. ................. | 528/328 |
| 5,484,945 A | 1/1996 | Nagatomo et al. .......... | 548/520 |
| 5,688,902 A | 11/1997 | Bernard et al. ............. | 528/313 |
| 5,756,595 A | 5/1998 | Mazo et al. ................. | 525/420 |
| 5,824,765 A * | 10/1998 | Lepage ........................ | 528/328 |
| 5,830,985 A | 11/1998 | Kroner et al. .............. | 528/328 |
| 5,888,959 A | 3/1999 | Kroner et al. .............. | 510/361 |
| 5,929,198 A | 7/1999 | Tang ........................... | 528/288 |

* cited by examiner

Primary Examiner—Duc Truong
(74) Attorney, Agent, or Firm—Fish & Richardson P.C.

(57) ABSTRACT

A polyaspartic acid is obtained from an amino acid having aspartic acid as an essential component thereof without entailing formation of a bulk substance. A method for the production of polyaspartic acid is described which includes heating an amino acid having aspartic acid as an essential component thereof in the presence of water. A novel polyaspartic acid obtained by this method of production is described.

20 Claims, No Drawings

POLYASPARTIC ACID

BACKGROUND OF THE INVENTION

1. Field of the Invention

This invention relates to a polyaspartic acid excelling in biodegradability and a method for the production thereof.

2. Description of the Related Art:

Conventionally polyaspartic acid has been produced by the dehydrating method which comprises heating solid aspartic acid thereby removing water therefrom. Methods which comprise heating solid aspartic acid in the presence of an acid catalyst (U.S. Pat. No. 5,688,902, U.S. Pat. No. 5,457,176, and U.S. Pat. No. 5,830,985) or in the absence of a catalyst (U.S. Pat. No. 5,391,764 and U.S. Pat. No. 5,319,145) by using a varying drying machine, a kneading and heating device, or an oven in the neighborhood of 200° C. thereby dehydrating and condensing the solid aspartic acid, heating solid aspartic acid in an organic solvent of a high boiling point thereby removing the water of condensation by azeotropy (U.S. Pat. No. 5,380,817, U.S. Pat. No. 5,484,945, and U.S. Pat. No. 5,756,595), and the like have been heretofore proposed for the production of polyaspartic acid.

For the purpose of polymerizing aspartic acid by using sulfuric acid, phosphoric acid, or boric acid as an acid catalyst, methods which comprises continuing the polymerization while removing the water of polymerization, and using water for aiding in uniformly mixing the acid catalyst with the aspartic acid have been disclosed. These methods, however, produce a substantially dried solid polymer by removing the water of polymerization by decompression, exposure to a stream of nitrogen, or azeotropy notwithstanding the relevant reactions proceed in their initial stages in the presence of water.

In these methods the solid aspartic acid tends to form a bulk substance during the course of polymerization and, therefore, it needs to perform such actions as disintegration on the bulk substance during the course of polymerization. Particularly when the acid catalyst is used, the polymerization forms a bulk substance like candy, thus this bulk substance must be disintegrated.

Further, the material derived from aspartic acid by heating in these methods is a solid polysuccinimide which is an intermediate of polyaspartic acid. The polysuccinimide is hydrolyzed with a base to produce a polyaspartic acid salt.

SUMMARY OF THE INVENTION

It is an object of this invention to obtain directly an acid type polyaspartic acid by a method which avoids forming a bulk substance in producing the polyaspartic acid by condensing an amino acid having aspartic acid essentially.

It is further an object of this invention to provide a novel polyaspartic acid.

The conventional method consists in performing the relevant polymerization while removing the water of polymerization. Unexpectedly it has been found that when an amino acid having aspartic acid as an essential component is suspended in water and heated, polyaspartic acid is formed even in the presence of water, the polymer yield exceeds 80%, the formed polymer is obtained in a state dissolved in water, and the polymer is an acid type polyaspartic acid polymer. As a result, this invention has been achieved.

The object of this invention is accomplished by a method for the production of a polyaspartic acid characterized by the steps of mixing an amino acid having aspartic acid as an essential component with water and heating the resultant mixture.

Further, the object of this invention is accomplished by a polyaspartic acid having such biodegradability that the ratio of biodegradation per 7 days of BOD is not less than 45%.

By the method of production according to this invention, a polyaspartic acid (containing an amino acid having polyaspartic acid as an essential component) having an excellent biodegradability can be obtained by an extremely simple procedure.

The polyaspartic acid of this invention is excellent particularly in biodegradability.

Since the polyaspartic acid of this invention excels in biodegradability, it is suitable as detergent additives, dispersion stabilizers, scale preventing agents, humectants, and fertilizers.

The other object of this invention is accomplished by a polyaspartic acid obtained by mixing an amino acid having aspartic acid as an essential component with water and then heating the resultant mixture.

The above and other objects, features and advantages of the present invention will become clear from the following description of the preferred embodiments.

DETAILED DESCRIPTION OF THE PREFERRED EMBODIMENTS

The term "polyaspartic acid" as used herein also embraces salts of polyaspartic acid. The counterions of polyaspartic acid include, but not limited to those below, for example alkali metals and alkaline earth metals, specifically sodium, potassium, magnesium, calcium, strontium, and ammonium cations.

This invention uses, as the raw material, an amino acid having aspartic acid as an essential component. The aspartic acid can be used in the form of L-, D-, or a mixture thereof. The aspartic acid may additionally incorporate therein one or more other amino acids in an amount up to 99% by weight, preferably 5 to 99% by weight, based on the weight of the aspartic acid. Suitable examples of the other amino acids may include glycin, alanine, asparagine, glutamic acid, lysine, valine, leucine, isoleucine, phenylalanine, methionine, histidine, proline, serine, threonine, and cysteine. Among other amino acids mentioned above, L-glutamic acid, L-alanine, and L-lysine prove particularly preferable because they are inexpensive and the polymers produced have high water solubility.

In this invention, polyaspartic acid can be produced by heating an amino acid having aspartic acid as an essential component (hereinafter occasionally referred to simply as "aspartic acid") in the presence of water.

The amount of the water to be used in the polymerization, though not particularly limited, generally has a lower limit of not less than 0.2 times, preferably not less than 0.5 times, and more preferably not less than 1 times and an upper limit of not more than 40 times, preferably not more than 20 times, and more preferably not more than 10 times the weight of the amino acid having aspartic acid as a main component. The amount of the water is preferred to be in the range of 0.2 to 40 times, especially 0.5 to 20 times, based on the weight of the amino acid having aspartic acid as the main component. If the amount is less than 0.2 times, the shortage will be at a disadvantage in suffering the resultant polymer to assume a bulk form. If this amount exceeds 40 times, the excess will be at a disadvantage in suffering the aqueous solution of the produced polymer to have an unduly low concentration and rendering the polymerization uneconomical.

The heating temperature in the polymerization, though not particularly limited, generally has a lower limit of not less than 140° C., preferably not less than 150° C., and more preferably not less than 160 C. and an upper limit of not more than 300° C., preferably not more than 250° C., and more preferably not more than 220° C. The heating temperature is preferred to be in the range of 140 to 300° C., especially 150 to 250° C. If the heating temperature is less than 100° C., the shortage will be at a disadvantage in lowering the yield of polymer. Conversely, if it exceeds 300° C., the excess will be at a disadvantage in impairing the biodegradability, one of the characteristics of the produced polymer.

The reaction is generally performed in a closed vessel proof against pressure, therefore, preferred to have an inner pressure exceeding 0.3 MPa, preferably in the range of 0.5–4 MPa.

An acid catalyst is preferably added in the polymerization of an amino acid. Commendably, an organic or inorganic acid having a lower pKa value than that of aspartic acid is used as the acid catalyst. Suitable examples of the inorganic acid may include phosphoric acids such as orthophosphoric, metaphosphoric, and polyphosphoric acids, phosphonic acids, phosphinic acids, sulfuric acid, sulfurous acid, pyrosulfuric acid, boric acid, and trifluoromethane sulfonic acid. Suitable examples of the organic acid may include acidic phosphoric esters such as methyl phosphoric, ethyl phosphoric, and phenyl phosphoric acids, phosphonic esters such as methyl phosphonic, ethyl phosphonic, butyl phosphoric, lauryl phosphonic, stearyl phosphonic, and phenyl phosphonic acids, and methane sulfonic acid and paratoluene sulfonic acid. The hydrogen salts of these acids are similarly usable. Suitable examples of the hydrogen salts of acid may include hydrogen phosphates such as $MH_2PO_4$ and $M_2HPO_4$ (wherein M denotes sodium, potassium, or calcium) and hydrogen sulfates such as potassium hydrogen sulfate, sodium hydrogen sulfate, nitrosyl hydrogen sulfate, and hydrazinium hydrogen sulfate. Among other compounds enumerated above, inorganic acids are advantageous and sulfuric acid, phosphoric acid, and boric acid are particularly advantageous.

The amount of the acid catalyst to be used has a lower limit of not less than 0.001 times, preferably not less than 0.01 times, and more preferably not less than 0.05 times and an upper limit of not more than 10 times, preferably not more than 2 times, and more preferably not more than 1 times, of the weight of the amino acid having aspartic acid as an essential component thereof. The amount of the acid catalyst is preferred to be in the range of 0.001 to 10 times, especially 0.01 to 2 times, based on the weight of the amino acid having aspartic acid as the main component. If this amount is less than 0.001 times, the shortage will be at a disadvantage in preventing the acid catalyst from fulfilling the effect thereof. Conversely, if this amount exceeds 10 times, the excess will be at a disadvantage in suffering the aqueous solution of the produced polymer to contain the unaltered acid catalyst in a large amount and consequently entailing an extra cost for disposing the residual acid catalyst.

The polymerization may be effected batchwise or continuously. In the batch case, a reactor such as a stirring vessel or a horizontal mixing device which can withstand the steam pressure at the polymerization temperature may be used. Then, in the continuous case, a method which comprises continuously feeding the reactor usable for the batch polymerization with a slurry of aspartic acid as the raw material, allowing the slurry to remain therein for a prescribed duration, and thereafter continuously removing the produced polymer from the reactor or comprises effecting the polymerization using a varying heat exchanger of a single plate, spiral, shell-and-tube, or plate type, i.e. a method resorting to a system which can withstand the steam pressure at the polymerization temperature and can continue the relevant heating operation under a condition exceeding the steam pressure for a prescribed duration of time, can be properly used. Among other reactors suggested above, particularly a line mixer proves advantageous. The line mixer can be continuously used for polymerization, when adapted to be pressed by means of a back-pressure valve and to be heated with a jacket or by immersion in a heat medium bed.

The single-tube type heat exchanger, for example, utilizes a device which comprises a unit for heating a coiled stainless steel pipe and a unit for cooling the coiled stainless steel pipe combined in series connection and a back-pressure valve incorporated so as to apply back pressure to the heating and the cooling units. The heating unit serves the purpose of furnishing the polymerization at a necessary temperature, for example, in a range of 140° C. to 300° C., preferably in a range of 150° C. to 280° C., especially in a range of 160° C. to 260° C. The pipe passes through a high-temperature chamber, a heating jacket, or an oil bath set at the above temperature. The retention time of the raw material liquid is generally in the range of one minute to 10 hours, preferably in the range of 2 minutes to 5 hours, and more preferably 5 minutes to 2 hours. The length of the pipe is generally not less than 0.1 m and preferably in the range of 0.5–100 m, depending on the retention time, velocity, and temperature.

Since the product occurring at a high temperature cannot be handled readily and safely in its hot state, the cooling unit serves the purpose of lowering the product temperature in the pipe to room temperature or to the neighborhood of 25° C. by air cooling or water cooling with a water tank. The length of the pipe is generally not less than 0.1 m and preferably in the range of 0.5 to 100 m, depending on factors such as the retention time of the liquid, velocity, and temperature.

The heating unit and the cooling unit each require application of back pressure, which is generally not less than 0.8 MPa and preferably in the range of 1 to 3 MPa. The inside diameter of the pipe is generally not less than 1 mm and preferably in the range of 2 mm to 1 m, depending on factors such as the retention time of the liquid and velocity. A mixture of the amino acid having aspartic acid as an essential component with water is fed as pressed by a pump such as a slurry pump. The feed rate of this mixture is not particularly limited but is only required to fall in a range in which the conditions mentioned above are satisfied. Generally, this range is 1 ml/minute–10 liter/minute. These conditions can be applied to operations using a shell-and-tube type or other device.

When the amount of water in the polymerization is small, a horizontally mixing device, for example, is particularly preferable because the viscosity tends to increase. Though the removal of water is not particularly required in the polymerization, the water may be removed partly in an amount up to 0.2 times the weight of the amino acid having aspartic acid as a main component when the polymer has a low concentration or it is needed to concentrate. When the amount of water is unduly small, the mixture under treatment turns into a strong bulk substance. Unduly increasing the concentration is unfavorable from the operational point of view.

An acid type polyaspartic acid polymer is produced in the form of an aqueous solution by heating the amino acid having aspartic acid as a main component in the presence of water according to the method of this invention. When an acid catalyst is used in this case, the produced polymer gains in biodegradability.

The polyaspartic acid obtained by the use of the acid catalyst is preferred to exhibit biodegradability such that the ratio of biodegradation on the 7 days after the start of test for BOD is not less than 45%, preferably not less than 47%, most preferably not less than 50%.

It is generally held that the relevant polymer is readily decomposable when the ratio of biodegradation is not less than 60% and is completely decomposed when this ratio is about 70%. The polyaspartic acid produced by using the acid catalyst according to this invention is characterized by exhibiting very satisfactory initial decomposability and having not less than about half thereof complete decomposition in one week after a decomposition test.

The weight average molecular weight of the produced polyaspartic acid is generally in the range of 2000–3800.

The polymer produced by the above method remains in the form of viscosity to an aqueous solution of low viscosity at high temperatures and, when cooled, assumes the state of candy like paste to an aqueous solution. The polymer produced in this case, when necessary, may be converted into a salt by being heated again or neutralized.

The polymer produced in the form of an aqueous solution, for example, may be separated as an acid type solid polyaspartic acid by a spray drying treatment, and the solidified polymer may be converted into a polysuccinimide type polymer by being heated again to a temperature in the range of 100 to 300° C. Further, the acid type polyaspartic acid polymer, when neutralized with a base incorporated therein, may be converted into a polyaspartic acid polymer salt. Suitable examples of the base may include hydroxides of alkali metals such as sodium, potassium, and lithium and alkaline earth metals such as calcium, magnesium, and strontium; primary organic amines such as cetyl amine, pentadecyl amine, tetradecyl amine, tridecyl amine, dodecyl amine, undecyl amine, decyl amine, nonyl amine, and octyl amine; secondary organic amines such as dibutyl amine and diamyl amine; and ammonium. Among other hydroxides of alkali metals, sodium hydroxide and potassium hydroxide prove particularly advantageous.

Further, the acid type polyaspartic acid polymer produced by polymerization, when heated with a varying amine or amino acid incorporated therein, may be converted into amine or amino acid-modified polyaspartic acid polymer (polyaspartic acid derivative).

We have further discovered that the molecular weight of the polymer is increased by concentrating the aqueous solution of the produced polymer. The method of concentration is not particularly restricted but has only to be capable of decreasing the water component of the aqueous solution. Thus, a method which comprises heating the aqueous solution of the polymer thereby expelling the water component by vaporization; decompressing the aqueous solution of the polymer thereby removing the water component; or completing the relevant reaction in an autoclave and then expelling the steam from the reaction vessel at a prescribed temperature, for example, may be adopted. Specifically, in the above heating method, the aqueous solution is generally maintained at a temperature in the range of 90–160° C. for a period in the range of 0.1–10 hours. In the above depressing method, the aqueous solution is generally maintained under a pressure in the range of 66–666 hPa for a period in the range of 0.1–10 hours. In the above steam expelling method, a procedure which comprises maintaining the aqueous solution usually at a temperature in the range of 100–160° C. and meanwhile decreasing the internal pressure of the autoclave may be adopted. Since the molecular weight of the polymer increases substantially in proportion to the degree of concentration, the concentration is properly effected to suit the purpose for which the produced polymer is used. The concentration is preferred to be continued till the amount of the water which is removed by the concentration reaches 90%, preferably 95%, of the initially charged amount of water. After this concentration, the produced polymer may be recovered as such or, when the polymer has been solidified, may be recovered after it has been diluted with water or with a weakly basic aqueous solution. As the base for this aqueous solution, the bases mentioned above may be used.

The polymer produced in consequence of the further concentration has a weight average molecular weight generally exceeding approximately 3800 and preferably falling in the range of 4000–6500. Comparison of the molecular weights before and after the concentration shows an apparent increase of the molecular weight.

The molecular weight of a given polyaspartic acid salt can be determined by gel permeation chromatography (GPC) using a standard sample of polyethylene glycol (PEG) of a known molecular weight, for example, as a standard and a measuring instrument available from Showa Denko K.K., type "Shodex OHpak Column." The results of this determination are expressed as reduced to PEG.

The biodegradability of the polyaspartic acid can be determined, for example, by the modified MITI test of the OECD test guide line.

The polyaspartic acid to be manufactured in accordance with the present invention can be used for its excellent biodegradability in additive to detergents, dispersion stabilizers, scale preventing agents, humectants, and fertilizers.

EXAMPLES

Now, this invention will be described more specifically below with reference to examples.

Biodegradability of Polyaspartic Acid

The polyaspartaic acid is tested for biodegradability by the procedure of the modified MITI test while using the returned sludge from an urban sewage disposal station. To be specific, to 200 ml of a basic culture solution specified as a composition solution in the paragraph titled "Biochemical Oxygen Demand" in JIS (Japanese Industrial Standard) K-0102, a given polyaspartic acid as a test sample is added in an amount calculated to account for 100 ppm and activated sludge is added in an amount calculated to account for 30 ppm. Thereafter, this basic culture solution is placed in a dark place kept at 25° C. and cultured as stirred for 28 days. The amount of oxygen consumed by the activated sludge is measured periodically to obtain a curve of biochemical oxygen demand (BOD) during the period of the culture.

The ratio of biodegradability (%) is calculated in accordance with the following formula and the ratio of the theoretical oxygen demand (TOD) of a substance used for the test, the formula using the biochemical oxygen demand A (mg) of a test sample obtained from the BOD curve mentioned above, the amount of oxygen B (mg) consumed by a blank, namely a basic culture solution, obtained from the BOD curve, and the theoretical oxygen demand (TOD) C (mg) required for perfect oxidation of the test substance:

Ratio of biodegradability (%)={(A−B)/C}×100

Then, the decrease of the total organic carbon (TOC) in the test solution is determined by TOC measuring instrument (availabe from Shimadzu Seisakusho Ltd in Japan, type "TOC-500"). The ratio of TOC removal was calculated in accordance with the following formula:

Ratio of TOC removal (%)={($(C_O-C_{BO})-(C_{28}-C_{B28})$)/$(C_O-C_{BO})$}×100 wherein $C_O$ denotes the TOC (mg/L) in test solution at the time of starting the test, $C_{28}$ denotes the TOC (mg/L) in test solution 28 days after the start of the test, $C_{BO}$ denotes the TOC (mg/L) in a system containing no test sample (blank test solution) at the time of starting the test, $C_{B28}$ denotes the TOC (mg/L) in a system containing no test sample (blank test solution) 28 days after the start of the test.

Degree of Conversion to Polymer

The degree of conversion to the polymer is determined by measuring the amount of the residual L-aspartic acid, the unaltered raw material remaining after the reaction, by liquid chromatography and then calculating the ratio of the amount of the residula L-aspartic acid to the amount of the raw material.

Example 1

A mixture of 15 g of L-aspartic acid, 15 g of deionized water, and 1.5 g of phosphoric acid was placed in an autoclave having an inner volume of 50 ml and heated to 180° C. When the internal temperature of the autoclave reached 180° C., the pressure in the autoclave was 1.1 MPa. When the autoclave was left standing for one hour and then cooled, the resultant content was found to be the aqueous syrupy solution of a uniformly dissolved polymer. The pH of the aqueous solution was 3.2 (25° C.). This polymer was found to be a weight average molecular weight (MW) of 3300. When this solution was left standing at room temperature, a large amount of polyaspartic acid was precipitated. When the solution containing the precipitated material was diluted by addition of water to 5 times the original volume, a uniform solution resulted. The degree of conversion into the polymer was 89% based on the weight of L-aspartic acid.

When the biodegradability of this polymer was measured in accordance with the modified MITI method, it was found to be 58.9% on the $7^{th}$ day after the start of the test, 71.2% on the $14^{th}$ day, and 70.2% on the $28^{th}$ day.

When the solution after the test for biodegradability was tested for the polyaspartic acid content by the GPC analysis, perfect extinction of the initial polyaspartic acid was confirmed.

The produced polyaspartic acid, when added to 100 ml of water and stirred therewith, dissolved by piecemeal addition of an aqueous 5N sodium hydroxide solution, and adjusted to pH 9.5, was converted to sodium polyaspartate. This solution was freeze dried to obtain sodium polyaspartate powder. When this powder was subjected to the NMR spectroscopic analysis, the following results were obtained. (The assignment of the relevant signals was carried out in accordance with Makromol. Chem. 194, 1095 (1993).)

$^1$H-NMR($D_2O$): δ=4.68(C(α)H,α-peptide), 4.49(C(α)H, β-peptide), 2.77(2H,C(β)H,H');

$^{13}$C-NMR($D_2O$): δ=177.81(C=O,β-peptide), 177.37 (C=O,α-peptide), 172.72(CONH,α-peptide), 172.62 (CONH,α-peptide), 172.02(CONH,β-peptide), 171.89 (CONH,β-peptide), 51.83(C(α),β-peptide, 51.38(C(α),α-peptide), 39.00(C(β),α-peptide), 37.69(C(β),β-peptide).

Example 2

A mixture of 15 g of L-aspartic acid, 15 g of deionized water, and 1.5 g of sulfuric acid was placed in an autoclave having an inner volume of 50 ml and heated to 180° C. When the internal temperature of the autoclave reached 180° C., the pressure in the autoclave was 1.1 MPa. When the autoclave was left standing for one hour and then cooled, the resultant content was found to be the aqueous syrupy solution of a uniformly dissolved polymer. The pH of the aqueous solution of this polymer was 3.2 (25° C.). This polymer was found to have a MW of 3400. When this solution was left standing at room temperature, a large amount of polyaspartic acid was precipitated. When the solution containing the precipitated material was diluted by addition of water to 5 times the original volume, it formed a uniform solution. The degree of conversion into the polymer was 85% based on the weight of L-aspartic acid.

When the biodegradability of this polymer was measured in accordance with the modified MITI method, it was found to be 65.1% on the 7th day after the start of the test, 77.4% on the $14^{th}$ day, 83.5% on the 28th day.

When the solution after the test for biodegradability was measured for the polyaspartic acid content by the GPC analysis, perfect extinction of the initial polyaspartic acid was confirmed.

Example 3

A mixture of 15 g of L-aspartic acid, 15 g of deionized water, and 1.5 g of boric acid was placed in an autoclave having an inner volume of 50 ml and heated to 180° C. When the internal temperature of the autoclave reached 180° C., the pressure in the autoclave was 1.1 MPa. When the autoclave was left standing for one hour and then cooled, the resultant content was found to be the aqueous syrupy solution of a uniformly dissolved polymer. The pH of the aqueous solution of this polymer was 3.2 (25° C.). When this solution was left standing at room temperature, a large amount of polyaspartic acid was precipitated. When the solution containing the precipitated material was diluted by addition of water to 5 times the original volume, it formed a uniform solution. The degree of conversion into the polymer was 88% based on the weight of L-aspartic acid.

This polymer was found to have a MW of 3600.

When the biodegradability of this polymer was measured in accordance with the modified MITI method, it was found to be 57.9% on the $7^{th}$ day after the start of the test, 72.2% on the $14^{th}$ day, 78.9% on the $28^{th}$ day.

Example 4

A mixture of 15 g of L-aspartic acid, 15 g of deionized water, and 1.5 g of phosphoric acid was placed in an autoclave having an inner volume of 50 ml and heated to 180° C. When the internal temperature of the autoclave reached 180° C., the pressure in the autoclave was 1.1 MPa.

When the autoclave was left standing for 30 minutes and then cooled, the resultant content was found to be the aqueous syrupy solution of a uniformly dissolved polymer. The pH of the aqueous solution of this polymer was 3.2 (25° C.). When this polymer was measured for molecular weight, it was found to have a MW of 3400. When this solution was left standing at room temperature, a large amount of polyaspartic acid was precipitated. When the solution containing the precipitated material was diluted by addition of water to 5 times the original volume, it formed a uniform solution. The degree of conversion into the polymer was 89% based on the weight of L-aspartic acid.

When the biodegradability of this polymer was measured in accordance with the modified MITI method, it was found to be 51.7% on the $7^{th}$ day after the start of the test, 64.0% on the $14^{th}$ day, 72.2% on the $28^{th}$ day.

When the solution remaining after the test for biodegradability was tested for the polyaspartic acid content by the GPC analysis, perfect extinction of the initial polyaspartic acid was confirmed.

Example 5

A mixture of 7.5 g of L-aspartic acid, 7.5 g of L-glutamic acid, and 15 g of deionized water was placed in an autoclave having an inner volume of 50 ml and heated to 180° C. When the internal temperature of the autoclave reached 180° C., the pressure in the autoclave was 1.1 MPa. When the autoclave was left standing for one hour and then cooled, the resultant content was found to be the aqueous syrupy solution of a uniformly dissolved polymer. The MW of this polymer was 2300.

Even when this solution was left standing at room temperature for one day, it remained in the form of uniform solution.

Example 6

A mixture of 7.5 g of L-aspartic acid, 7.5 g of L-glutamic acid, 15 g of deionized water, and 1.5 g of phosphoric acid was placed in an autoclave having an inner volume of 50 ml and heated to 180° C. When the internal temperature of the autoclave reached 180° C., the pressure in the autoclave was 1.1 MPa. When the autoclave was left standing for one hour and then cooled, the resultant content was found to be the aqueous syrupy solution of a uniformly dissolved polymer.

Even when this solution was left standing at room temperature for one day, it remained in the form of uniform solution.

Example 7

A mixture of 7.5 g of L-aspartic acid, 7.5 g of L-alanine, 15 g of deionized water, and 1.5 g of phosphoric acid was placed in an autoclave having an inner volume of 50 ml and heated to 180° C. When the internal temperature of the autoclave reached 180° C., the pressure in the autoclave was 1.1 MPa. When the autoclave was left standing for one hour and then cooled, the resultant content was found to be the aqueous syrupy solution of a uniformly dissolved polymer.

Even when this solution was left standing at room temperature for one day, it remained in the form of uniform solution.

Example 8

A mixture of 15 g of L-aspartic acid, 1.5 g of L-lysine, 15 g of deionized water, and 1.5 g of phosphoric acid was placed in an autoclave having an inner volume of 50 ml and heated to 180° C. When the internal temperature of the autoclave reached 180° C., the pressure in the autoclave was 1.1 MPa. When the autoclave was left standing for one hour and then cooled, the resultant content was found to be the aqueous syrupy solution of a uniformly dissolved polymer.

Even when this solution was left standing at room temperature for one day, it remained in the form of uniform solution.

Example 9

A mixture of 15 g of L-aspartic acid, 1.5 g of phosphoric acid, and 15 g of deionized water was placed in an autoclave having an inner volume of 50 ml and heated to 180° C. When the internal temperature of the autoclave reached 180° C., the pressure in the autoclave was 1.1 MPa. When the autoclave was left standing for one hour and then cooled, the resultant content was found to be in the form of uniformly dissolved syrup.

The syrup and 1.28 g of cysteamine hydrochloride added thereto were mixed and the mixture was further heated at 180° C. for one hour. When the autoclave was cooled, the content brought out therefrom contained a small amount of insoluble material. The solution was neutralized by adding 4 g of sodium hydroxide to produce the aqueous solution of a cysteamine-modified polyaspartic acid derivative.

Example 10

A mixture of 15 g of L-aspartic acid, 1.5 g of phosphoric acid, and 15 g of deionized water was placed in an autoclave having an inner volume of 50 ml and heated therein to 180° C. When the autoclave was left standing for one hour and then cooled, the content was uniformly dissolved. When the solution was frozen with liquefied nitrogen and dried with a freeze-drying device, a light yellow solid substance was obtained.

When this solid substance was dissolved in heavy water and analyzed by $^1$H-NMR analyzer, the NMR spectrum of polyaspartic acid was obtained. From this fact, the formation of polyaspartic acid without requiring neutralization with a base was confirmed.

Example 11

A light yellow solid substance was obtained by repeating the procedure of Example 10. This solid substance was spread on a vat made of stainless steel and dried with a drying device at 140° C. for four hours. The solid substance, after the drying, was insoluble in water. When this solid substance was added to 60 ml of an aqueous 2N sodium hydroxide solution and stirred therein, it was uniformly dissolved.

When this solution was freeze dried and the resultant solid substance was dissolved in heavy water and analyzed by $^1$H-NMR analyzer, the NMR spectrum of polyaspartic acid was obtained. From this fact, it was confirmed that the solid polyaspartic acid, when heated, could be converted into polysuccinimide insoluble in water.

Example 12

A mixture of 15 g of L-aspartic acid and 15 g of deionized water was placed in an autoclave having an inner volume of 50 ml and heated to 180° C. When the internal temperature of the autoclave reached 180° C., the pressure in the autoclave was 1.1 MPa. When the autoclave was left standing for one hour and then cooled, the resultant content was found to be the aqueous syrupy solution of a uniformly dissolved polymer. The pH of the aqueous solution was 3.5 (25° C.). This polymer was found to have a MW of 3400. When this solution was left standing at room temperature, a large amount of polyaspartic acid was precipitated. When the solution containing the precipitated material was diluted by addition of water to 5 times the original volume, it formed a uniform solution. The degree of conversion into the polymer was 90% based on the weight of L-aspartic acid.

When the biodegradability of this polymer was measured in accordance with the modified MITI method, it was found to be 43.0% on the $7^{th}$ day after the start of the test, 52.3% on the $14^{th}$ day, 56.4% on the $28^{th}$ day.

Comparative Example 1

A solution of 98 g of maleic anhydride in 100 ml of deionized water was neutralized by addition of 68 g of 25% aqua ammonia. This solution was freeze dried to prepare a monoammonium salt of maleic acid.

When 66 g of the produced monoammonium salt of maleic acid was spread on a vat made of stainless steel, placed in a hot air drying device set at 180° C., heat-treated therein for 7 hours, and then cooled, 53 g of polysuccinimide was obtained. This polysuccinimide was hydrolyzed with 300 ml of water and 20 g of sodium hydroxide added thereto and the resultant hydrolyzate was allowed by addition of water to produce an aqueous 10% sodium polyaspartate solution.

When this aqueous 10% sodium polyaspartate solution was tested for biodegradability, it was found to be 10.8% on the seventh day after the start of the test, 37.6% on the $14^{th}$ day, and 45.6% on the $28^{th}$ day.

Comparative Example 2

When 66.5 g of powdered L-aspartic acid was spread on a vat made of stainless steel, placed in a hot air drying device set at 200° C., heat-treated therein for 12 hours, and then cooled, 57 g of polysuccinimide was obtained. This polysuccinimide was hydrolyzed with 300 ml of water and 20 g of sodium hydroxide added thereto and the resultant hydrolyzate was allowed by addition of water to produce an aqueous 10% sodium polyaspartate solution.

When this aqueous 10% sodium polyaspartate solution was tested for biodegradability, it was found to be 7.4% on the seventh day after the start of the test, 33.4% on the $14^{th}$ day, and 44.9% on the $28^{th}$ day.

Comparative Example 3

A thorough mixture of 66.5 g of powdered L-aspartic acid and 14 g of ortho-phosphoric acid was spread on a vat made of stainless steel, placed in a hot air drying device set at 200° C., and heat-treated therein for six hours. Six hours thereafter, the bulk substance was removed from the drying device, pulverized, further heated for six hours, and then cooled to obtain 65 g of polysuccinimide.

This polysuccinimide was hydrolyzed with 300 ml of water and 20 g of sodium hydroxide added thereto and the resultant hydrolyzate was allowed by addition of water to produce an aqueous 10% sodium polyaspartate solution. When this aqueous 10% sodium polyaspartate solution was tested for biodegradability, it was found to be 9.9% on the seventh day after the start of the test, 67.3% on the $14^{th}$ day, and 74.0% on the $28^{th}$ day.

Comparative Example 4

Sodium poly-L-aspartate having a weight average molecular weight of 12000 (available from Sigma Corp., type P5387) was tested for biodegradability. As a result, the biodegradability was found to be 41.7% on the $7^{th}$ day after the start of the test, 71.5% on the $14^{th}$ day, and 72.0% on the $28^{th}$ day.

Comparative Example 5

Sodium poly-D, L-aspartate having a weight average molecular weight of 5800 (available from Sigma Corp., type P3418) was tested for biodegradability. As a result, the biodegradability was found to be 36.0% on the $7^{th}$ day after the start of the test, 73.2% on the $14^{th}$ day, and 73.0% on the $28^{th}$ day.

Example 13

A mixture of 50 g of L-aspartic acid, 50 g of deionized water, and 5 g of sulfuric acid was placed in a stirrer-fitted autoclave having an inner volume of 200 ml and heated to 180° C. After the internal temperature of the autoclave was retained at 180° C. for 30 minutes and then lowered by cooling to 90° C., the content of the autoclave was removed. The removed content was the aqueous syrupy solution of a polymer. When this polymer was diluted, neutralized, and tested for molecular weight, it was found to have a MW of 3400. The degree of conversion to the polymer was 85% based on the weight of the L-aspartic acid.

Example 14

A mixture of 50 g of L-aspartic acid, 50 g of deionized water, and 5 g of sulfuric acid was placed in a stirrer-fitted autoclave having an inner volume of 200 ml and heated therein to 180° C. After the internal temperature of the autoclave was retained at 180° C. for 30 minutes, a valve fitted in the upper part of the autoclave was slightly opened. With the autoclave retained at a temperature of not less than 120° C., the steam was released to concentrate the content. The discharged steam was condensed in a cooling pipe and recovered. After the amount of the condensate reached 32 ml, the valve was closed and the autoclave was cooled to 90° C. and the content of the autoclave was removed in the form of soft candy like paste. When this substance was diluted, neutralized, and tested for molecular weight, it was found to have a MW of 4000.

Example 15

A mixture of 50 g of L-aspartic acid, 50 g of deionized water, and 5 g of sulfuric acid was placed in a stirrer-fitted autoclave having an inner volume of 200 ml and heated therein to 180° C. After the internal temperature of the autoclave was retained at 180° C. for 30 minutes, a valve fitted in the upper part of the autoclave was slightly opened. With the autoclave retained at a temperature of not less than 120° C., the steam was released to concentrate the content. The discharged steam was condensed in a cooling pipe and recovered. After the amount of the condensate reached 41 ml, the valve was closed and the autoclave was cooled to 90° C. and the content of the autoclave was removed in the form of candy like paste. When this substance was diluted, neutralized, and tested for molecular weight, it was found to have a MW of 5300.

Example 16

A mixture of 50 g of L-aspartic acid, 50 g of deionized water, and 5 g of sulfuric acid was placed in a stirrer-fitted autoclave having an inner volume of 200 ml and heated therein to 180° C. After the internal temperature of the autoclave was retained at 180° C. for 30 minutes, a valve fitted in the upper part of the autoclave was slightly opened. With the autoclave retained at a temperature of not less than 120° C., the steam was released to concentrate the content. The discharged steam was condensed in a cooling pipe and recovered. After the amount of the condensate reached 42 ml, the valve was closed and the autoclave was cooled to 90° C. and the content of the autoclave was removed in the form of candy like paste. When this substance was diluted, neutralized, and tested for molecular weight, it was found to have a MW of 5600.

Example 17

A mixture of 50 g of L-aspartic acid, 50 g of deionized water, and 5 g of sulfuric acid was placed in a stirrer-fitted autoclave having an inner volume of 200 ml and heated therein to 180° C. After the internal temperature of the autoclave was retained at 180° C. for 30 minutes, a valve fitted in the upper part of the autoclave was slightly opened. With the autoclave retained at a temperature of not less than 120° C., the steam was released to concentrate the content. The discharged steam was condensed in a cooling pipe and recovered. After the amount of the condensate reached 45 ml, the valve was closed and the autoclave was cooled to 90° C. and the content of the autoclave was removed. The removed content was in the form of candy like paste. When this substance was diluted, neutralized, and tested for molecular weight, it was found to have a MW of 6150.

Example 18

A mixture of 50 g of L-aspartic acid, 50 g of deionized water, and 5 g of sulfuric acid was placed in a stirrer-fitted autoclave having an inner volume of 200 ml and heated therein to 180° C. After the internal temperature of the autoclave was retained at 180° C. for 30 minutes, a valve fitted in the upper part of the autoclave was slightly opened. With the autoclave retained at a temperature of not less than 120° C., the steam was released to concentrate the content. The discharged steam was condensed in a cooling pipe and recovered. After the amount of the condensate reached 46 ml, the valve was closed and the autoclave was cooled to 90° C. and the content of the autoclave was removed. The removed content was in the form of candy like paste. When this substance was diluted, neutralized, and tested for molecular weight, it was found to have a MW of 6500.

Example 19

An apparatus was prepared by binding a unit for heating a coiled stainless steel pipe in an oil bath and a unit for cooling the coiled stainless steel pipe in a water tank in series connection and further providing a back-pressure valve for applying a back pressure of 1.5 MPa to the heating and the cooling units. The stainless steel tube had a diameter of ¼ inch and the heating unit had a length of 10 m and the cooling unit a length of 3 m. The temperature of the oil bath was set at 250° C.

A mixture of 5 kg of L-aspartic acid, 5 kg of water, and 0.5 kg of sulfuric acid was forwarded by a slurry pump to the apparatus mentioned above at a rate of 25 ml per minute and subjected to continuous polymerization therein. The retention time of the mixture in the heating unit was 2.8 minutes. The aqueous solution of a syrupy polymer was obtained through the back-pressure valve. When this polymer was measured for molecular weight, it was found to have a MW of 3400.

In the examples, the solutions of produced polymers were invariably uniform solutions slightly colored in light yellow to approximately brown. These polymers had MWs in the approximate range of 2000–6500.

The entire disclosure of Japanese Patent Application No. 11-257973 filed on Sep. 10, 1999 including specification, claims and summary are incorporated herein by reference in its entirety.

What is claimed is:

1. A method for producing a polyaspartic acid, which comprises:

mixing an amino acid having aspartic acid as an essential component thereof with water; and heating the resultant mixture to perform polymerization in the presence of water.

2. A method according to claim 1, wherein an amount of the water added for the mixture is in the range of 0.2–40 times based on the weight of the amino acid having aspartic acid.

3. A method according to claim 2, wherein the amount of the water is in the range of 0.5 to 20 times the weight of the amino acid having aspartic acid.

4. A method according to claim 1 further incorporates an acid catalyst in the mixture.

5. A method according to claim 4, wherein a pKa value of the acid catalyst is lower than that of aspartic acid.

6. A method according to claim 5, wherein the acid catalyst is selected from the group consisting of phosphoric acid, sulfuric acid and boric acid.

7. A method according to claim 6, wherein an amount of the acid catalyst is in the range of 0.001 to 10 times based on the weight of the amino acid having aspartic acid.

8. A method according to claim 1, wherein the heating temperature is in the range of 140 to 300° C.

9. A method according to claim 8, wherein the heating temperature is in the range of 150 to 250° C.

10. A method according to claim 9, wherein the heating temperature is in the range of 160 to 220° C.

11. A method according to claim 1, wherein the heating is carried out by the use of a heat exchanger.

12. A method according to claim 11, wherein a retention time of the mixture through the heat exchanger is in the range of 1 minute to 10 hours.

13. A method according to claim 1, wherein an amino acid other than aspartic acid is selected from the group consisting of glutamic acid, alanine and lysine.

14. A method according to claim 13, wherein a rate of the amino acid other than aspartic acid to the aspartic acid is 5 to 99:100 by weight.

15. A method according to claim 1, wherein the heating is carried out under a pressurized condition.

16. A method according to claim 15, wherein the heating is carried out in the range of 0.8 to 3 MPa.

17. A method according to claim 1 further comprises condensing the polymer obtained by the heating.

18. A polyaspartic acid having biodegradability such that a ratio of biodegradation after 7 days of the start of test for BOD is not less than 45%.

19. A polyaspartic acid according to claim 18, wherein the ratio of biodegradation is not less than 47%.

20. A polyaspartic acid obtained by mixing an amino acid having aspartic acid as an essential component thereof with water and heating the resultant mixture to perform polymerization in the presence of water.

* * * * *